United States Patent [19]

Gordon et al.

[11] 4,125,317

[45] Nov. 14, 1978

[54] OPTICAL INSPECTION SYSTEM EMPLOYING DUAL PATH PICKUP SYSTEM WITH SINGLE SPHERICAL MIRROR

[75] Inventors: Jason M. Gordon, Katonah, N.Y.; Peter E. Raber, Milford, Conn.

[73] Assignee: United Technologies Corporation, Hartford, Conn.

[21] Appl. No.: 855,117

[22] Filed: Nov. 26, 1977

[51] Int. Cl.² .................. G01B 11/24; G02B 27/14
[52] U.S. Cl. .................................. 356/376; 350/174; 356/390
[58] Field of Search .............. 356/156, 163–166; 250/578; 350/174

[56] References Cited

U.S. PATENT DOCUMENTS

| 2,607,267 | 8/1952 | Fultz et al. | 356/163 |
| 2,741,153 | 4/1956 | Reason et al. | 356/166 |
| 3,523,736 | 8/1970 | Bottomley | 356/156 |

FOREIGN PATENT DOCUMENTS 1,385,912  5/1975  United Kingdom .......... 356/164

Primary Examiner—John K. Corbin
Assistant Examiner—Wm. H. Punter
Attorney, Agent, or Firm—Richard P. Lange

[57] ABSTRACT

An optical system having a single spherical mirror for collecting light from two directions combined by a beam splitter after the light has been scattered from the surface of a turbine blade or the like. The spherical mirror is located at an equal optical distance from both the surface of the test specimen and a linear detector array so that it operates at a one-to-one magnification ratio. The linear detector array receives light focused by the mirror along a path folded by the beam splitter. This arrangement is helpful in contouring the surface of a turbine blade near a vertical obstruction such as a shroud of a turbine blade since the collection axes of the pickup legs view the incident spot from different directions. None of the optical elements of the inspection system are located in the plane of movement of the test specimen so that even particularly long items such as a helicopter rotor blade can be contoured. Identical upper and lower optical systems allow both surfaces of the test specimen to be contoured simultaneously. An automatic gain control is provided to adjust the optical modulator so that the effective intensity of the beam incident on the detector array is maintained within predetermined limits.

5 Claims, 2 Drawing Figures

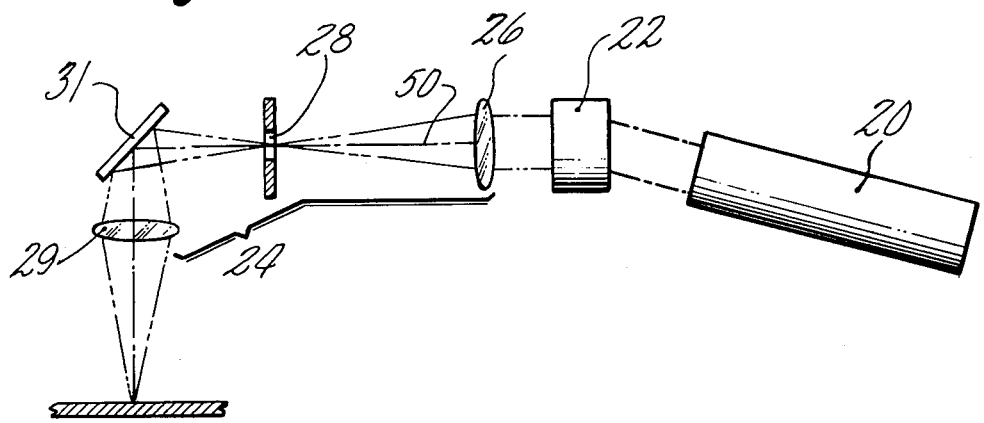

OPTICAL INSPECTION SYSTEM EMPLOYING DUAL PATH PICKUP SYSTEM WITH SINGLE SPHERICAL MIRROR

BACKGROUND OF THE INVENTION

1. Field of the Invention

This invention relates to an optical system for contour measuring and, more particularly, to an optical system used with a contouring device to measure the cross section of the blades and vanes used in a turbine engine.

2. Description of the Prior Art

The measurement of a complex surface by taking a successive series of cross section measurements is generally known as "contouring." Knowing the precise shape of a complex surface can be particularly important where the surface is interacting with a fluid, and hence accurate contouring is a necessary prerequisite to the efficient design of blade and vanes used in a turbine engine. One such optical inspection system is disclosed in U.S. patent application Ser. No. 751,557 filed on Dec. 17, 1976 and assigned to the same assignee as the present application and now abandoned. In the embodiment disclosed in FIG. 2, a first and second pair of mirrors are spaced apart about the collecting axis; this axis also coincides with the plane in which the turbine blade is moved. A focusing lens is located between the first and second pair of mirrors along the collecting axis. A beam of light from a laser is directed to the surface of a blade. The pairs of planar mirrors collect light scattered from the spot on the surface of the turbine blade and, after focusing by the lens, present an imaged spot to the diode array. An imaged spot from both the upper and lower surface of the test specimen is presented to the diode array. Variation in the thickness of the turbine blade causes corresponding vertical movements of the light spots on opposite sides of the turbine blade, and this, in turn, results in a proportional deviation of the imaged spot on the linear diode array. By electrically interrogating the incremental elements of the diode array for each step of the movement of the beam across the blade cross section, an electrical signal indicative of the contour of the cross section is derived.

Another optical inspection system is disclosed in U.S. patent application Ser. No. 751,558 filed on Dec. 17, 1976, also assigned to the same assignee as the present invention and now abandoned. The optical inspection system described in this application employs a pair of parallel mirrors and a beam splitter which are used to view the incident light beam on the surface of the turbine blade from two different directions. The beam splitter optically combines light from separate paths thereby allowing a contour to be taken close to either shroud of the turbine blade without remounting the test specimen.

Another optical contouring device is disclosed in U.S. Pat. No. 3,782,827 issued to T. Neeson on Jan. 1, 1974. In this system a test specimen is moved under a beam of light and the reflected image passes through a beam splitter, an objective lens, and a pinhole aperture.

U.S. Pat. No. 3,909,131 issued to J. Waters on Sept. 30, 1975, also assigned to the same assignee as the present invention, describes a slightly different concept for surface gaging. A collimated light beam is focused on the test specimen and the light scattered therefrom is collected through a lens and presented to a detector via a folding mirror.

Other techniques and apparatus for contouring complex surfaces are described in U.S. Pat. No. 3,174,392 issued to K. Rantsch on Mar. 23, 1965, U.S. Pat. No. 3,975,102 issued to A. Rosenfeld on Aug. 17, 1976, U.S. Pat. No. 3,894,802 issued to P. Higgens on July 15, 1975, U.S. Pat. No. 3,918,816 issued to G. Foster on Nov. 11, 1975, U.S. Pat. No. 3,898,007 issued to K. Wiklund on Aug. 5, 1975 and U.S. Pat. No. 3,898,583 issued to D. Shuey on Aug. 5, 1975.

Many of the hereabove identified prior art systems which employ a coherent source of light such as a laser exhibit a condition known as "speckle" resulting in spatial variation of intensity across the beam incident on the test specimen. As a result, when the incident beam is projected onto a diode array, these intensity variations create a nonpredictable response, and this reduces spot resolution when the elements of the array are electrically interrogated.

Some prior art optical inspection systems have lenses or other optical elements which are located in the plane of movement of the test specimen. This can be a particular problem when the test specimen is very long, such as the main rotor blade of a helicopter or the like, since such "on axis" optical elements limit the length along the test specimen which can be contoured.

Still other prior art systems employed conventional low cost spherical lenses and located these elements either "on axis" or "off axis" to collect light scattered from the incident spot. The conventional low cost type of spherical lens most often used in such systems exhibits certain inherent aberrations. These aberrations introduce optical errors into the measuring device which limit accuracy.

Another problem occurs in the type of system in which light is collected from both sides of a test specimen simultaneously and then the imaged spots are presented to a single diode array of the charged-coupled type. This problem results from the fact that these spots are close together when measuring thin portions of the specimen, such as near the forward or trailing edge of a turbine blade. As the result of electrical charge "spill over", adjacent diode elements erroneously appear to be receiving light from the focused spot and electrical interrogation of the elements of the diode array can render erroneous data concerning the thickness of the test specimen at that point.

In some prior art systems in order to measure the complete contour of a turbine blade it was necessary to move either the illuminating optics or the viewing optics, or both, with respect to the test specimen so that the incident axis and the collecting axis always cross at the surface of the test specimen. Inherently, the movement of the optical elements require very accurate mechanical parts which can provide a readout of the position of the changes in the axis crossings. These systems are expensive and generally have lower accuracy than the type of system with fixedly mounted optical elements.

SUMMARY OF THE INVENTION

It is a primary object of the present invention to provide an improved optical apparatus for use in the contour measuring of a test specimen in which the "speckle" problem is minimized.

According to the present invention, a spherical mirror having a one-to-one magnification ratio is employed to direct light scattered from an incident beam on the surface of a test specimen to a linear detector array. A main beam splitter is disposed parallel to both the contour plane and a pair of secondary beam splitters for viewing the incident spot from opposite collecting axes. The light in the separate legs is combined by the main beam splitter along a single axis prior to focusing by the spherical mirror. Return light from the spherical mirror is folded by the main beam splitter and it passes through one of secondary beam splitters in the path to the detector array. The reflectivity of both the main and secondary beam splitters is selected to equalize the intensity of light from each leg presented to the spherical mirror.

According to the present invention an optical system is described which has no optical elements in the plane of movement of the test specimen rendering it well suited to contouring long test specimens such as the main rotor of a helicopter or the like.

According to the present invention, an optical measuring system is described in which the optical pickup elements are particularly well suited for use with a coherent light source to minimize the "speckle" content inherent in such sources of electromagnetic radiation. The "speckle" is smoothed or averaged by collecting light throughout a large solid angle via the big aperture formed by the spherical mirror operating at a one-to-one magnification ratio so that the spot of light presented to the detector array is relatively uniform in intensity across its diameter.

According to the present invention, an optical inspection system forms a part of an independently operable upper and lower noncontact contouring device for simultaneously measuring the surface variation on both sides of a test specimen. Each optical system collects light in two directions and then a beam splitter combines the light along a common axis thereby allowing the contouring of the surface near either end of a double shrouded turbine blade without reversing the test specimen in the jig.

According to another aspect of the present invention, an optical inspection system is disclosed in which no movement of the optical elements or the detector array is required during the contouring process. Conventional rigid mounting of the optical elements and detector array allow a high degree of accuracy during the contouring process.

The foregoing, and other objects, features and advantages of the present invention will become more apparent in the light of the following detailed description of the illustrated embodiment as set forth in the accompanying drawing.

BRIEF DESCRIPTION OF THE DRAWING

FIG. 2 is an end view of one of the light sources which is used to direct a narrow beam of electromagnetic radiation to the test specimen.

DESCRIPTION OF THE ILLUSTRATED EMBODIMENT

Figure 1:
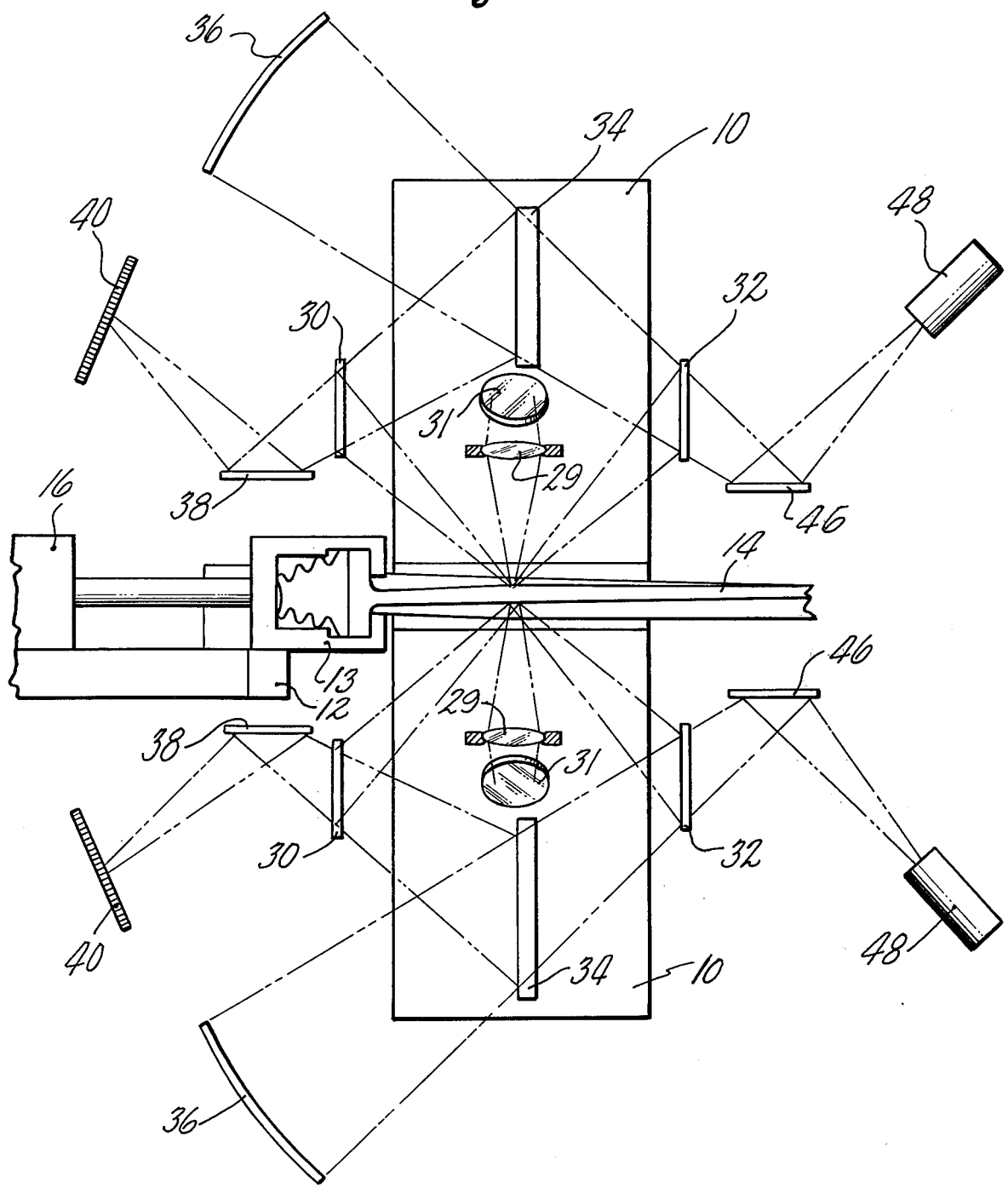
FIG. 1 is a simplified elevational view illustrating the major components of the inspection apparatus according to the present invention.

The major component part of an optical inspection apparatus according to the present invention is illustrated in FIG. 1. Many of the mounting brackets that position the components have not been shown in the drawing for simplification since the structural details of these components would be apparent to those of ordinary skill.

As shown in FIG. 1, a base member 10 forms the main structural support element of the optical inspection apparatus and a jig 12 with a jaw 13, fixedly attached thereto, grips one end of a turbine blade 14. The jaw 13 is adapted to be mechanically moved lengthwise in a horizontal plane by a first motor-driven extender 16 and laterally in the same plane by a second motor-driven extender (not shown). Accordingly, the test specimen can be moved in a planar manner in response to an electrical control signal provided to the first and second motor-driven extenders.

In order to simultaneously contour both sides of a test specimen, a separately operable optical system is provided on each side of the turbine blade. Referring additionally to FIG. 2, each system includes an electromagnetic radiation source comprised of a laser 20 which is fixedly mounted to base member 10 so that it projects a beam of light along an axis which is slightly skewed to the incident axis, the significance of this alignment will be described in greater detail hereinafter. An optical modulator 22 is fixedly mounted to base member 10 so that it receives the beam of light from the laser 20. From the optical modulator the light in each system is presented to a spatial filter 24. Optical spatial filters are generally known, and in the embodiment of the present invention comprise a first lens 26, an aperture 28, and a second lens 29, all fixedly mounted on the base member 10 along the incident optical axis. A mirror 31 is positioned between the aperture 28 and the second lens 29 to fold the incident axis and provide sufficient space for the mounting of the optical elements in the pickup channel as will be described hereinafter. It will be appreciated that the illustrated embodiment employs a source of electromagnetic radiation with an incident axis folded by the mirror 31. The only significance of this is to provide sufficient mounting space for the optical elements of the present invention.

As indicated herebefore, the optical inspection apparatus according to the present invention has separate systems for the simultaneous contouring of both surfaces of the test specimen. In addition, each optical system has dual legs in the pickup channel for viewing the surface of the turbine blade from different directions at the same time. This is particularly significant when inspecting a double shrouded turbine blade or other such test specimen that has a vertical wall at each end thereof since it is unnecessary to reverse the turbine blade in the jig for contouring that portion of the surface close to the perpendicular wall. Furthermore, the collecting axis of each optical system is "off axis" or oblique to the plane of movement of the test specimen. Thus, none of the optical elements of the system are located in the plane of movement of the test specimen so that a long surface such as a helicopter rotor blade can be contoured with the optical configuration of the present invention.

As is seen in FIG. 1, each pickup channel includes a pair of optical elements 30 and 32 fixedly mounted to view the surface of the turbine blade 14. These elements are beam splitters and direct a portion of the light scattered from the surface of the turbine blade 14 to a main beam splitter 34 which is disposed parallel to the plane of the contour. One end face of the main beam splitter 34 (i.e. the left face as viewed in FIG. 1) is approximately aligned with the plane of the contour. The main beam splitter 34 combines electromagnetic radiation from the separate legs of the collecting axis and directs it along a common axis toward a spherical mirror 36 which is positioned normal to the collecting axis. The spherical mirror 36 is located so that it operates at a one-to-one magnification ratio.

After striking the spherical mirror 36, light is reflected back along the same path, and this light is incident on the main beam splitter 34 whereupon a portion thereof is directed to the secondary beam splitter 30. A portion of this light passes through the secondary beam splitter 30. A mirror 38 folds the collecting axis and directs the light beam to a linear detector array 40.

Within certain limits, the displacement of the spot on the surface of the detector array 40 has a known relationship to the vertical displacement, as shown, of the focused spot on the surface of the turbine blade 14. Since the linear detector array 40 is formed from a number of incremental photoresponsive elements arranged in a stacked configuration, the particular elements which receive the spot of light will be indicative of the displacement in the contour plane on the turbine blade. Each element in the detector array 40 can be rapidly interrogated by known electrical circuitry (not shown) to electrically ascertain the cross-sectional dimension.

Referring still to FIG. 1, in operation the turbine blade 14 is first moved lengthwise by the first actuator 16 to the point along it surface at which the chord or cross-sectional measurement to be taken is aligned with the incident axis from the light source. The turbine blade 14 is then moved laterally by the second actuator in incremental steps and the detector array 40 is electrically interrogated at each step. Within certain limits, the displacement of the imaged spot on the detector array 40 is approximately equal to the corresponding displacement of the spot on the surface of the turbine blade due to the one-to-one magnification ratio of the spherical mirror 34. Since the linear detector array 40 is formed from a number of incremental photoresponsive elements arranged in a stack configuration, the particular elements which receive the spot of light will be indicative of the vertical depth or thickness at each step along the cross sectional contour. Of course, as will be appreciated in the event that the curvature and positioning of the spherical mirror 36 are such that it no longer has a one-to-one magnification ratio, the vertical movement on the detector array 40 will be directly proportional to the particular magnification ratio used.

As a practical matter, it is not necessary that the turbine blade be stopped at each incremental step by the second linear actuator in measuring each cross section. This is because the linear detector array 40 can be electrically interrogated at a high rate of speed so that the turbine blade appears essentially stationary during the interrogation period. If fact, it is contemplated that the entire process of moving the turbine blade 14 through a successive series of contouring sequences together with the interrogation of the detector array 40 and the recordation of the measurement would be under the control of a microprocessor or the like which would completely automate the inspection process but for the initial mounting of the turbine blade.

As indicated earlier, a particular advantage of the optical system according to the present invention is that it is not subject to interference caused by a vertical wall situated on the surface of the test specimen. This feature results from the fact that there are two legs in the collection axis, each viewing the scattered light from a different direction. Therefore, if one leg is blocked, such as by a shroud at the end of the turbine blade 14, the other leg is free from interference and presents a portion of the scattered light to the spherical mirror 36.

Although a manual control could be employed to adjust the intensity of the beam incident on the surface of the turbine blade, an automatic gain control is preferably provided to compensate for any irregularity in the surface qualities of the turbine blade 14 which cause a variation in image spot intensity on the diode array 14. Referring to FIG. 1, the automatic gain control system includes a planar mirror 46 disposed to receive light focused from the spherical mirror 36 and passing through the secondary beam splitter 32. The planar mirror 46 directs the focused beam of light to a photodiode 48. The photodiode 48 together with known electrical circuitry (not shown) vary the control signal applied to the optical modulator 22 to adjust the effective intensity of the beam incident on the surface of the turbine blade 14. A separate spherical mirror or other optical device is not required with the optical system of the present invention since the spherical mirror 36 through the beam splitters 34 and 32 divide the light collected by the mirror 36 and present portions thereof to both the linear diode array 40 and the photodiode 48.

An important aspect of the invention is that the optical path length in each leg be identical to ensure that the spherical mirror 36 is operating at a one-to-one magnification ratio. Accordingly, the distance from the spot on the surface of turbine blade 14 to the main beam splitter 34 via either the secondary beam splitter 30 or the secondary beam splitter 32 is identical. As will be apparent, this does not require that the elements be symmetrically positioned at an equal distance from the incident axis, this means only that the combined path to the combining surface of the main beam splitter 34 through each leg be equal. Furthermore, the reflectivities of all the beam splitters (i.e. optical elements 30, 31 and 32) are selected to provide equal beam intensity to the spherical mirror 36 via either leg.

A feature of the present invention is that some of the aberrations which reduce accuracy are minimized. In some circumstances the most significant aberration is known as "coma". If coma is the largest aberration, compensation for this phenomena is introduced into the pickup system by inserting a "window" into the collection axis between the second beam splitter 30 and the linear detector 40. The "window" is a piece of glass whose thickness is chosen to equalize the distances of optical path in which the light is passing through glass to and from the spherical mirror 36. As is known, if both the main beam splitter and the secondary beam splitters in the present invention were to be "pellicles", the aberrations of coma and astigmatism which are related to the thickness of the beam splitters could be essentially eliminated. "Pellicles" are ultra thin beam splitters but lack both the rigidity and the optical quality obtainable with glass. Therefore, present day pellicles often vibrate when used in close proximity to motor driven machinery causing a variation in the focused image on the detector array. In most situations it has been found that it is more desirable to compensate the errors introduced by the thickness of glass beam splitters rather than attempt to compensate for the realities of using a pellicle.

Referring again to FIG. 2, another aspect of the present invention involves the manner in which the coherent light source cooperates with the spatial filter to minimize the number of optical components necessary to project the beam onto the turbine blade. The laser 20 is oriented so that it is slightly off axis to the incident axis 50 (shown exaggerated for purposes of illustration) and it cooperates with the spatial filter to prevent a spot of light from reaching the surface of the turbine blade in response to a control signal applied to the optical modulator 22. The optical modulator 22 is preferably of the acoustical-optical type in which an acoustical driver (not shown) creates a wave front which diffracts the coherent light beam from the laser 20. In the presence of a modulating signal, the modulator 22 redirects the collimated light beam along the incident axis 50 and the first lens 26 focuses the light on the aperture 28. The pinhole size of the aperture 28 removes spurious noise and other interfering waveforms from the collimated electromagnetic beam and passes essentially a "clean" beam. A mirror 31 folds the incident axis and directs the light beam to the second lens 29 for focusing on the surface of the turbine blade.

The above embodiment is to be considered in all respects as merely illustrative and not restrictive. The scope of the invention is to be determined by the appended claims rather than the foregoing description. It is intended that all changes in constructions which would come within the meaning and range of the equivalency of the claims are to be embraced therein.

Having thus described typical embodiments of our invention, that which we claim as new and desire to secure by Letters Patent of the United States is:

1. An optical system for use with apparatus for contouring the surface of a test specimen, comprising:
   jig means for moving said test specimen in a plane;
   source means for directing a beam of electromagnetic energy along an incident axis toward said test specimen;
   main beam splitter means disposed perpendicular to the plane in which said test specimen moves;
   secondary beam splitter means having at least two optical members disposed on opposite sides of said incident axis, each collecting scattered electromagnetic energy along a separate axis and redirecting said electromagnetic energy toward said main beam splitter to be combined along a common collecting axis;
   spherical mirror means disposed along said collecting axis at an optical distance from surface of the test specimen such that it operates at approximately a one-to-one magnification ratio, for focusing electromagnetic energy impinging thereon; and
   means responsive to electromagnetic energy focused by said spherical mirror for indicating contour variations in said test specimen.

2. An optical system according to claim 1, wherein said source means comprises a coherent light source for radiating a beam of electromagnetic energy along an axis skewed to the incident axis, an optical modulator for receiving light from said coherent source and redirecting it along said incident axis in response to a control signal, and a spatial filter means for removing spurious electromagnetic energy from the beam along said incident axis.

3. An optical system according to claim 1, wherein said spatial filter means comprises a first lens disposed to receive energy along the incident axis from said optical modulator, an aperture positioned at the focal point of said first lens and a second lens for receiving electromagnetic energy passing through said aperture and focusing the same on the surface of said test specimen.

4. An optical system according to claim 1, wherein said electromagnetic energy focused by said spherical mirror means is folded by said main beam splitter means and passes through said secondary beam splitter means along an axis toward said means responsive to electromagnetic energy.

5. An optical system according to claim 1, further including an automatic gain control means for receiving a portion of said electromagnetic radiation focused by said spherical mirror for adjusting the effective intensity of the beam on said test specimen.

* * * * *